No. 808,733. PATENTED JAN. 2, 1906.
G. W. DU BES.
POCKETLESS STANDARD.
APPLICATION FILED SEPT. 30, 1905.
2 SHEETS—SHEET 1.
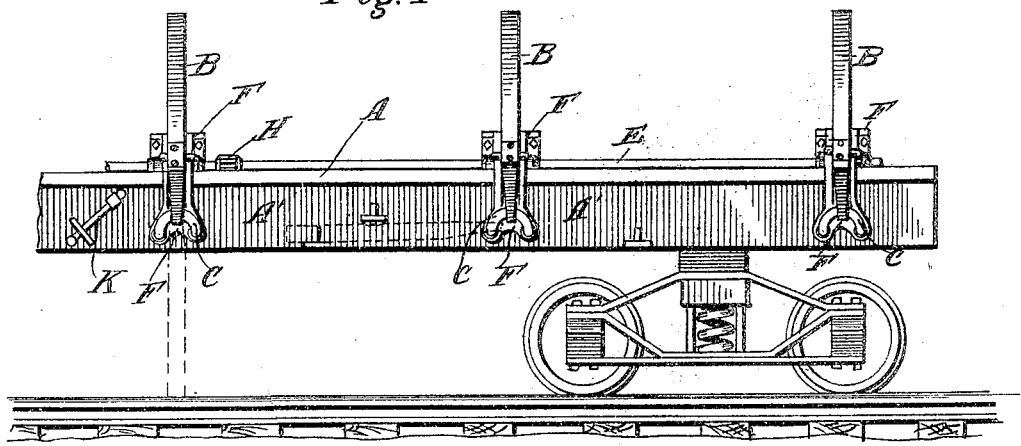
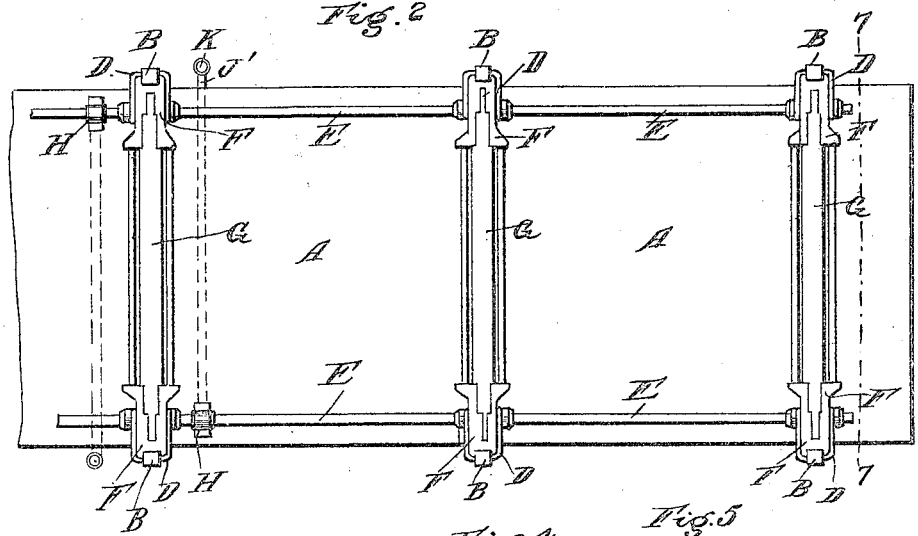
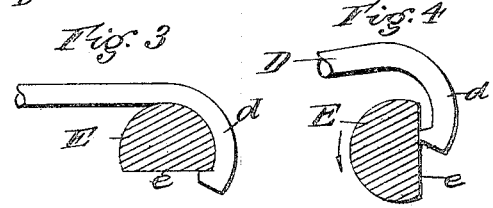
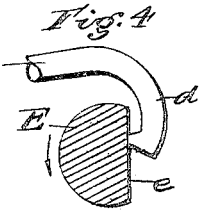
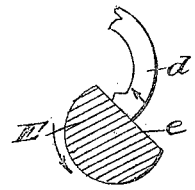
WITNESSES
INVENTOR
George W. Du Bes No. 808,733. PATENTED JAN. 2, 1906.
G. W. DU BES.
POCKETLESS STANDARD.
APPLICATION FILED SEPT. 30, 1905.
2 SHEETS—SHEET 2.
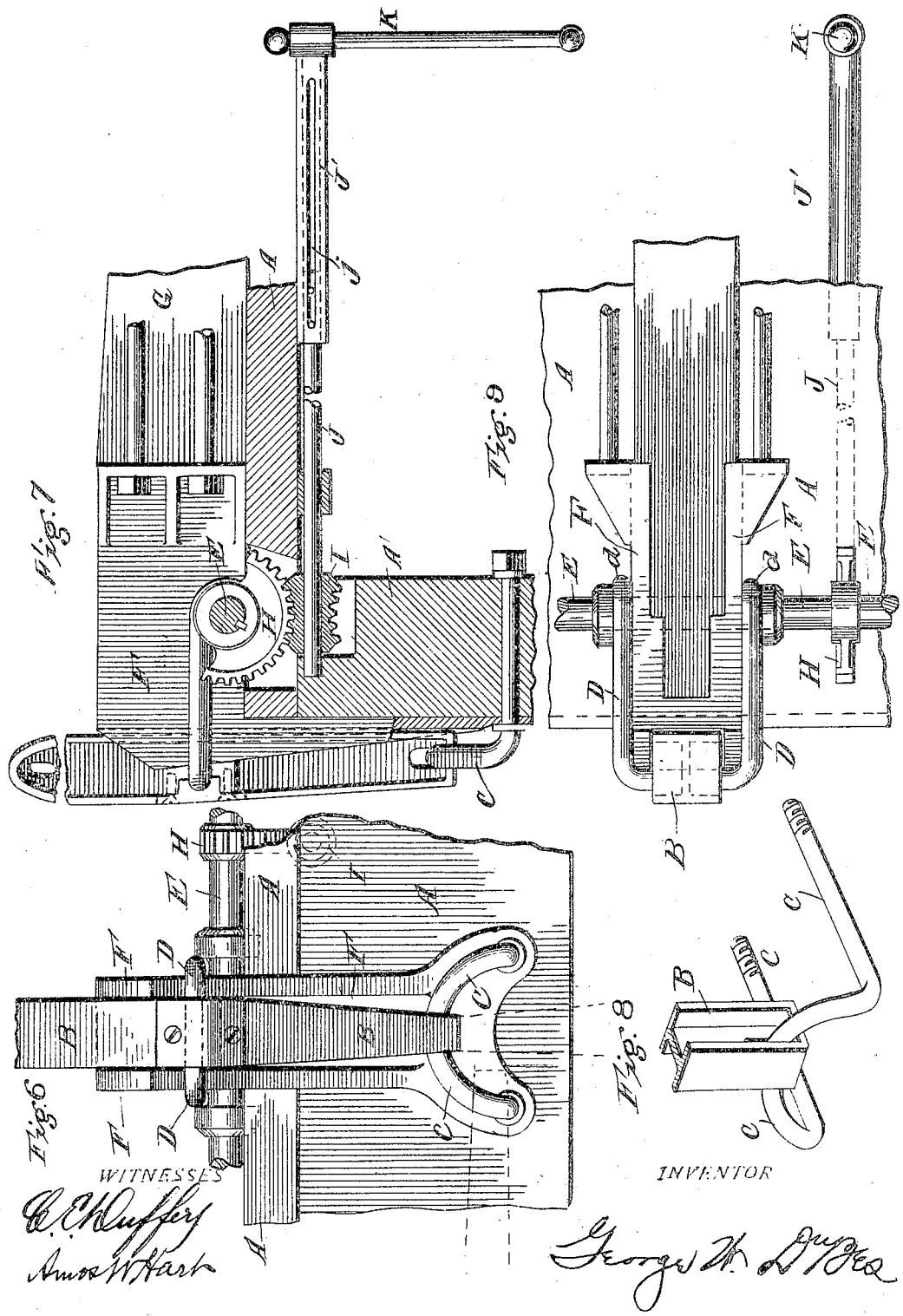
WITNESSES
INVENTOR

UNITED STATES PATENT OFFICE.

GEORGE W. DU BES, OF NEW ORLEANS, LOUISIANA.

POCKETLESS STANDARD.

No. 808,733.     Specification of Letters Patent.     Patented Jan. 2, 1906.

Application filed September 30, 1905. Serial No. 280,842.

*To all whom it may concern:*

Be it known that I, GEORGE W. DU BES, a citizen of the United States, and a resident of New Orleans, in the parish of Orleans and State of Louisiana, have made certain new and useful Improvements in Locking and Releasing Mechanism for Standards of Logging-Cars, of which the following is a specification.

My invention is an improved means for releasing the standards or stakes pivoted on the sides of logging and other flat cars, whereby this operation can be easily effected and with entire safety and great despatch.

The details of construction, arrangement, and operation of parts are as hereinafter described, and illustrated in accompanying drawings, in which—

Figure 1 is a side view of a logging-car provided with my invention. Fig. 2 is a plan view of the same. Figs. 3, 4, and 5 are detail views illustrating the engagement and release of hooks connected with the pivoted standards. Fig. 6 is an enlarged side view of a standard and adjacent portions and the locking and releasing mechanism. Fig. 7 is an enlarged vertical section on the line 7 7 of Fig. 2. Fig. 8 is a perspective view illustrating the hinge or pivot of the standards and the connection of the latter therewith. Fig. 9 is an enlarged plan view of a standard and other connected parts, the standards being shown locked, as in Figs. 6 and 7.

A indicates the body or floor or platform of a logging-car, and B the standards thereof, to which my improved releasing attachment is applied. The standards are arranged as usual on opposite sides of the floor A, as shown in Fig. 2. They are hinged (see Figs. 6, 7, and 8) to the upturned and curved ends of U-shape bolts C, whose legs pass through the car-sill A' and are secured by nuts and collars, as shown in Fig. 7. It will be seen that this connection and arrangement of parts permits the standards B to turn directly outward and downward when released and also to turn downward alongside the sill A' to a horizontal position, (indicated by dotted lines, Fig. 7,) in which it is supported by any suitable device secured to and projecting from the car-sill A'.

The standards B are held in normal vertical or working position by means of clevis-shape hooks D, which are hinged thereto at their middle, their inner or free ends being curved downward and formed as hooks proper, *b*. (See Fig. 3.) The hooks engage detachably flat portions *e* of rotatable shafts E, which are arranged over the floor A of the car adjacent and parallel to the side edges (see Fig. 2) of the body or floor A. The said shafts have their bearings in castings or iron blocks F, that form the ends of so-called "bunks" G, extending across the car floor or body A, as shown in Figs. 2, 7, and 9. On each shaft E is keyed a segmental gear H, (see Fig. 7,) which engages a worm I, keyed upon a rotary shaft J, which is arranged transversely beneath the floor A of the car and supported in suitable bearings. A sliding extension J' of said shaft is connected with it, the same being hollow and provided with one or more slots *j*, that receive lateral pins of the shaft J. The outer end of the tubular extension J' is provided with a slidable handle K, the same being held in an eye or cuff on the end of the extension and adapted to slide therein.

In several figures, notably in Figs. 3, 7, 9, the hooks D are shown engaged with the shafts E in the manner represented in Fig. 3, whereby the standards B are held firmly in vertical or working position. It will be understood that since there is practically no slip between the segment H and the worm I the segment is locked in any position to which it may be rotated, and therefore it holds the hooks and standards in working position without the aid of any supplemental device. When, however, it is desired to release the standards, so that they may fall directly outward for the purpose of unloading the car, the operator standing on the opposite side of the car from that on which the unlocking is to be effected draws out the shaft extension J' until the handle K may be freely rotated, which being done in the required direction, the segment H is rotated so that it successively assumes the positions indicated in Figs. 4 and 5—that is to say, in the position shown in Fig. 3 the hooks are engaged with the flat portions *e* of the shafts E, and therefore, as before stated, the standards are held rigidly in vertical position; but when the shaft E is rotated a quarter around the position is indicated in Fig. 4, and when rotated still farther the flat side assumes such an angle to the hook proper that it may slide off and become disengaged from the shaft, as indicated by arrows. Upon such disengagement the standards fall outwardly, so as to release the load on that side. It will be understood that the required operation of the segment is effected with great ease or with the application of slight manual force and with entire safety, since the operator stands on the side of the car opposite that where the release is to be effected. It will be further understood that the same operation is performed when it is desired to lower the standards into the horizontal position. (Indicated by dotted lines in Fig. 1.) When the handle K is not required for use, the slidable shaft extension J' is pushed inward until the handle is close to the side of the car, when it may be inserted and held in a clasp or any other suitable device secured to the sill of the car.

What I claim is—

1. The combination with a car-body, of standards hinged on the sides of the same and provided with pivoted hooks adapted to extend inward, a rotary shaft arranged in bearings parallel to the side of the car and adapted for engagement with said hooks, gears fixed to said shaft, a transverse shaft having a worm which engages such gear and is adapted to rotate or lock the same, and means for rotating the transverse shaft, substantially as described.

2. The combination with the car-body, of standards pivoted on the sides of the same, hooks hinged to the standards and adapted to extend inward therefrom, a shaft arranged parallel to the side edge of the car adjacent to the standards and provided with flattened portions with which the hooks are adapted to engage, a segmental gear keyed on the shaft, a worm engaging the segment, and a transverse shaft on which the worm is keyed, the same having a slidable extension provided with a handle, substantially as described.

3. The combination with a car-body, standards pivoted on the sides of the same, hooks pivoted to the standards and a shaft arranged along the edge of the car-body and provided with a gear, of means for operating and locking the latter consisting of a worm and a shaft on which the same is mounted, the shaft extending transversely beneath the car, a sliding tubular shaft applied to the worm-shaft, and a slidable handle applied to the outer end of the tubular extension, substantially as described.

4. The combination with a car-body of devices attached to the side thereof, and consisting of U-bolts having the curved central portion bent upward, standards mounted loosely on such curved portions, and means for locking and releasing the standards, substantially as described.

5. The combination with the car-body and standards therefor, of supports for the standards having curved portions arranged parallel to the side of the car, and the convex side of the curve being uppermost, and means for locking and releasing the standards, substantially as described.

In testimony whereof I affix my signature in presence of two witnesses.

GEORGE W. DU BES.

Witnesses:
 JNO. J. WARD,
 W. N. HUFF.